United States Patent [19]

Gaffney

[11] Patent Number: 4,675,194

[45] Date of Patent: Jun. 23, 1987

[54] SONIC PROCESS FOR CONVERTING PROTEINACEOUS RAW MATERIALS IN SITU INTO SEMI-SOLID FOOD PRODUCTS

[75] Inventor: Bernard J. Gaffney, Stillwater, Minn.

[73] Assignee: Reaction Technology, Inc., Stillwater, Minn.

[21] Appl. No.: 835,205

[22] Filed: Mar. 3, 1986

[51] Int. Cl.$^4$ .......................... A23C 9/12; A23C 19/00
[52] U.S. Cl. .......................................... 426/39; 426/40; 426/42; 426/238; 426/245; 426/656; 426/657; 426/516; 426/582; 426/583
[58] Field of Search ....................... 426/36, 40, 42, 39, 426/238, 580, 582, 656, 657, 583, 245, 34, 516

[56] References Cited

U.S. PATENT DOCUMENTS

| | | | |
|---|---|---|---|
| 2,138,051 | 11/1938 | Williams | 426/238 |
| 3,582,365 | 6/1971 | Lindsey | 426/238 |
| 3,899,595 | 8/1975 | Stenne | 426/238 |

Primary Examiner—Raymond N. Jones
Assistant Examiner—Marianne M. Cintins
Attorney, Agent, or Firm—Herman H. Bains

[57] ABSTRACT

A continuous steady state flow process for converting proteinaceous materials by reacting the proteinaceous materials with coagulants or other precipitants in situ. Streams of proteinaceous materials and coagulants are fed into an introduction chamber under a predetermined pressure and are directed through an orifice as a high velocity jet stream into a resonance chamber to impinge against a vibratile element. The energy from the jet stream is transferred to the vibratile element to cause it to vibrate at high sonic or ultrasonic frequencies. The high sonic or ultrasonic energies are transferred to the mixture of proteinaceous materials and coagulants to produce a cavitational effect and cause instantaneous reaction and homogenization of the proteinaceous materials and coagulants to thereby form a protein matrix.

21 Claims, 7 Drawing Figures

SONIC PROCESS FOR CONVERTING PROTEINACEOUS RAW MATERIALS IN SITU INTO SEMI-SOLID FOOD PRODUCTS

FIELD OF INVENTION

This invention relates to a continuous steady state flow process for instantaneous in situ reaction and homogenization of natural proteins and fats with coagulating agents to form semi-solid food products.

BACKGROUND OF THE INVENTION

Present cheese systems are unruly and ill-defined because milk feed is not chemically uniform and the microbes and enzymes involved are variable in concentration and kind, and milk composition varies with cow feed, as does percentage. Microorganisms and enzymes metabolic processes are a complicated function of the aforementioned variables. This invention addresses the problem of conventional non-homogenized reaction mix. In contrast, this invention treats, for example, milk being fed with, at near instant of time, all the ingredients necessary for initial base product concomitantly with ultimate dispersion of ingredients and conditions thereof necessary and sufficient for final cheese product properties. It is postulated that the longer the time for conversion and synthesis of the base product (prior to subsequent treatments and aging), the greater the problem of control to make a product with desired organoleptic and other properties. This is supported by a history of present production problems and studies well documented.

DESCRIPTION OF PRIOR ART

All cheese manufacturing begins in essentially the same way. Basically, cheese results from processing protein containing milk, or equivalent, to render the protein insoluble as a curd; and, thereafter, by physical processing to work the curd and separate soluble components as whey. Conventionally, an initial step comprises adding microorganisms (starters) causing conversion of contained lactose to lactic acid which lowers the pH to a protein isoelectric point, which renders the protein insoluble.

In certain cheese products, rennet is added to convert proteinaceous materials to cheese, e.g., Mozarella, and this concomitantly opens pathways for the whey or whey-like liquids to be expressed naturally and/or by pressing. Raising the temperature assists with rate and the maximum temperature is limited, depending on the particular enzyme added. These enzymes are heat-sensitive.

Final steps include salting to assist expressing whey, while affecting taste and stabilizing, bacteriological aging, and drying. The number of variables affecting results are seen to be numerous and attest to the difficulties of control, including composition consisting of the feed stock, long time conversion under changing temperature, pH and physical treatment of a heterogenous mass and its separation, and aging conditions. The initial physical/chemical reaction is the major determinant in assuring a product of defined quality and control. The subject invention addresses the economic, as well as the fundamental cheese processing steps. Conventional processes require big investments in large equipment to accommodate the large holdup time and manpower.

Mechanical milling, salting, draining, and pressing into molds gets the cheese to storage where metabolic activity results in what is known as curing. This is a slow action that, to varying degrees and selectivity, breaks down lipids (fats) and proteins to produce a number of acids and other compounds contributing to a sharp taste and/or other organoleptic properties.

The final product consistency and taste are predominantly determined in the later curing stages, not only by the organism used, but by salt and humidity levels, and the curing temperature.

The whey from conventional processes contains high percentages of lactose and poses economic problems of disposal or of use. The whey, after cheese salting, has been a most troublesome and costly disposal problem, including environmental issues.

These cured cheeses are either sold as such or used in combination with some more or less bland cheese base to produce so-called processed cheese products, like Kraft Velveeta.

It has long been known that to utilize milk economically, rather than skimming off the cream and using it for products which impose a skim milk end use dilemma, or part use in making cheese which imposes a whey problem, one might find means for separating components, such as lactose, which could find several commercial outlets, and concomitantly eliminate the whey problem as now known, while producing a delactosed (essentially) protein fraction.

Also, the advent of commercial utltrafiltration and diafiltration has brought about such economic realizations and a large number of possibilities. Additionally, swept surface vacuum evaporation techniques can now deliver a concentrated protein stream for conversion, as one example, to cheese once suitably fortified with fat or lipids.

Up to this point, these preliminary concentrating processes can be done in a continuous manner. Converting to cheese products via microbial technology still requires very large equipment (batch or continuous) and investment, and is still burdened with maintaining selective mixed microbial populations without contamination.

Cheeses of various types are produced by innoculating pasteurized milk or milk fractions with special starter cultures, which, although expensive, do better insure reproducibility and product quality. Great pains in protecting these cultures and the starter medium must be exerted, lest the mixed microbial populations be adversely changed. These organisms convert principally contained lactose to lactic acid. When acidity builds up to a protein isoelectric point, a proteinaceous curd is precipitated and the liquid or whey portion is drained off. The procedure normally takes hours.

When hard cheeses are made, an enzyme mixture of rennet (containing proteolytic enzyme rennet) is added to the innoculated milk after slightly acid conditions are produced. The resulting curd is like a gel and is cut into small pieces to drain, or in a stirred reactor produces a stirred curd providing whey draining from these solids.

There are any number of starter cultures and non-starter bacteria which, along with added enzymes, etc., play a role in the final cheese characteristics.

Certain prior art methods have been developed, including the methods described hereinbelow.

A DDS method by Maden, R. F. and P. Bjena, 1981 (*North European Dairy Journal*, 5: 135), wherein, after ultrafiltration, the retentate is acidified in agitated tanks about 16 hours with a 1% cheddar culture, and if the acidification has not progressed to a pH of 5.2, the final acidification will reportedly occur in the packaged product within 24 hours.

Another method by Ernstrom, C. A. et al. (*J. Dairy Science*, 63: 228–234) relies also on innoculation to produce lactic acid in 12–14 hours. The pH is controlled by assuming complete fermentation of all the lactose present, versus the buffering capacity of the proteins.

In the Maubois, J. L. J. et al. method U.S. Pat. No. 4,205,090, a lactic acid starter was also used and mold spores (if product was to be Camembert) and rennet, and after 30 minutes cheese can be removed from the form and placed on slats on forms without bottoms for 14–16 hours. The cheese base was then salted and ripened.

Coulter, S. T., et al. method U.S. Pat. No. 3,988,481 proposes using ultrafiltration to remove lactose from skim milk, while concentrating milk protein via swept surface evaporator and conventionally adding a curd forming agent to the so concentrated milk protein and further processing the formed curd to produce cheese.

The Dahlstrom U.S. Pat. No. 3,645,751 addresses the problem of making Mozarella cheese via a continuous flow method of low moisture with direct acidification, versus traditional culture/coagulant procedures, reduced total time from 3 to 4½ hours to a total time of 20 minutes. Coagulation was obtained via reaction in pumping reactants through a long pipe (808 feet) at a velocity of 85 ft./min., prior to draining. Thereafter, the curd is milled to produce desired plasticity and cooled, salted, and then packaged.

The Wakeman U.S. Pat. No. 3,585,721 discloses a mechanical process which utilized direct acidification and quiescent heating for the continuous manufacture of cottage cheese curd. Milk admixed to pH 4.6° or 4.4° C. was fed to a heat exchanger bundle of 0.79 cm tubes surrounded by the heating medium. The curd formed in vertical movement up the tubes emerging at 37.7° C., with whey being expressed along the tube wall. Reactor time reportedly was 20 minutes. Here, again, was absence of internal mixing, nonisothermal reaction, and whey/curd separation.

SUMMARY OF INVENTION

An object of this invention is to provide a continuous steady state flow process to convert proteinaceous materials by reacting them with acids or other precipitants in situ and instantaneously concomitant with homogenization of fats and other components to obtain products exhibiting a precipitated protein matrix under ultimate process and product control of the coagulum so produced.

It is an object of this invention to provide a process for reacting basic protein materials and acids or other precipitants in a continuous manner to instantaneously form a semi-solid food product.

More specifically, it is an object of this invention to provide a novel process in which a plurality of streams of materials, including a protein material and a food grade acid, are directed to a mixing orifice into contact with a resonating medium in a resonating chamber to cause the resonating medium to resonate at high sonic and ultrasonic frequencies and to produce a cavitational effect so as to cause the protein and acid materials to instantaneously react thereof and to form a semi-solid homogenized food product.

Another object of this invention is to provide a novel process in which protein material is instantaneously acidified by a food grade acid in a resonating chamber by high sonic and ultrasonic energy to instantaneously and continuously form a firm cheese or cheese-like product.

The subject invention is uniquely suited to produce cheese bases and admits enzymes and other additives to produce cured or aged cheese products, or products of like characteristics from non-dairy feed stock or raw material.

The application of this invention to satisfying nutritious food needs in Third World countries, even via non-dairy raw materials and products, will become apparent in the body of this Patent Disclosure and Claims.

Further, using concentrated ingredients in a sonolated reaction permits one to obtain the ultimate in conversion and yield with, under predetermined conditions, no conventional whey that is costly to dispose of or use.

These and other objects of the invention will be more fully described in the following Specification.

FIGURES OF THE DRAWING

FIG. 6b is a diagrammatic cross-sectional view of the orifice illustrated in FIG. 6a.

DESCRIPTION OF THE PREFERRED EMBODIMENT

In the preferred embodiment, liquid streams of protein material, food grade acid (or precipitant), other additives are directed through an orifice where there is thorough admixing of the materials which exit the orifice as a single stream and engage a resonating medium in a resonating chamber. The kinetic energy of the mixed stream of materials is transferred to the resonating medium which vibrates at high sonic and ultrasonic frequencies. This ultrasonic energy causes mixing, dispersion, and instantaneous reactions of the basic materials to form a semi-solid food product. Although the process comprising the present invention has wide utility, it is especially adapted for use in continuously and instantaneously forming cheese-like products. It will be appreciated that direct acidification of protein materials requires rapid reaction times to avoid localized coagulation of the protein. As pointed out elsewhere, various kinds of mechanical mixers have been developed, but they simply cannot achieve the complete and substantially uniform mixing and reaction in a short time. Further, these mechanical mixing devices cannot accommodate several streams of feed material.

Mixing and dispersion and mass and heat transfer play important roles in all conversion processes and particularly so in converting of heterogeneous fluids. For processes requiring short time results, practices for other applications include jet mixers and injectors, baffle plate and orifice-column, turbine and centrifugal pumps, spray and packed towers, colloid mills, and homogenizers.

For the ultimate in terms of minimizing time requirement, jets and turbine pumps and homogenizers would be considered. When one must mix two or more streams, introduction of these at a fixed ratio requires consideration of something approaching feeding differential increments of each stream into a mixing zone. The latter was the criteria conceived. The rate of reaction is optimized by providing the greatest area of particle surface per unit volume.

The conventional jets where one or more impinge on each other work for miscible fluids, but not well for heterogeneous mixing or dispersion. The time element, however, is short. A turbine mixer where material enters an impeller axially through a central opening can, from experience, be modified by having a hollow shaft through which to feed a second stream and would give a partial mix in some short time, and is restricted as to practically combining several streams. In the homogenizing field, colloid mills and Manton Gaulin type equipment prevail. Colloid mills usually are applied for dispersing suspended solids by shearing and grinding between conical serrated plates and can reduce particle size to a few microns. Frictional heat is developed, and the rate of shear progresses over the time travel from the truncated apex of the cone to its expanded radius base. Besides the time factor, feeding multiple streams, according to the criteria conceived, could not be met.

Thinking of very short times for dispersion and reaction, a Manton Gaulin type homogenizer was also analyzed. This has the inherent difficulty of feeding several streams and in meeting the criteria conceived, and is a rather massive costly piece of equipment.

Consideration was given to a combination of jet and ultrasonic energy modes to meet the criteria. Ultrasonic homogenizers made by Sonic Corp. were studied and then employed—these are called Sonolators. Other ultrasonic devices have to date not had sufficient output to treat the multi-gallons per minute rate needed in most commercial applications.

Figure 1:
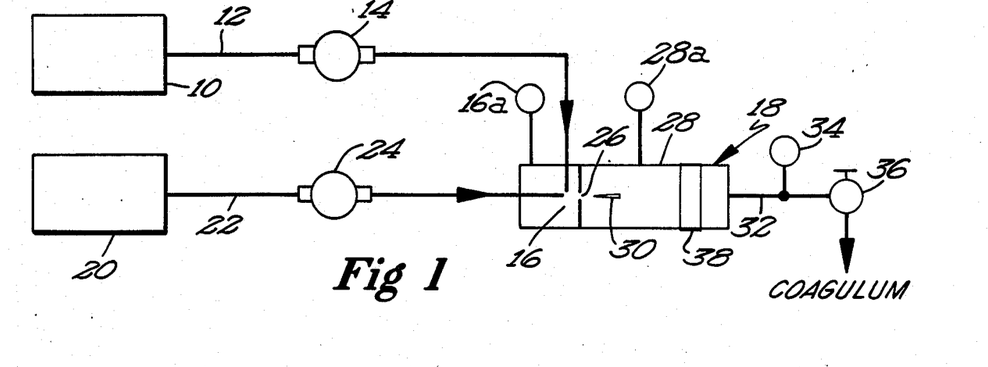
FIG. 1 is a diagrammatic view of one embodiment of an apparatus used for carrying out the novel method.

In FIG. 1, fluid systems to be dispersed and/or reacted are forced through a specially designed orifice 26 producing a flat jet that impinges on and flows over a rigidly mounted cantilevered blade 30, all confined in a pipe conduit 28. A back pressure turning valve 36 and arrangement to adjust the distance of the frontal edge of the blade to orifice face is provided.

The sonic device is a patented device for which energy transformation modes have been somewhat more or less explained, but results of so processing still are a matter of experimentation as, in fact, are in mixing and dispersion those of general, and in the case of chemical or bio reactions, this is all the more true. Sometimes one gets unusual results, as in crystallization phenomena which might have some analogy to the cheese making experiments.

The Sonic Corp. description referring to FIG. 1 of their brochure states that:

"The Sonolator TM is an in-line homogenizer designed to convert the kinetic energy of high-velocity liquid stream into high-intensity mixing energy. The conversion of energy within the liquid stream is accomplished by utilizing a physical phenomenon known as 'jet-edge tone'.
What happens to a stream of process liquid as it passes through the Sonolator's mixing chamber is described hereinbelow.
(1) A jet of process liquid under pressure (usually supplied from a positive displacement pump) is forced through an elliptical orifice at a velocity of 150 fps or more, and is directed at the edge of a blade-like obstacle in its path.
(2) Between the orifice and blade-like obstacle, the jet of liquid sheds vortices perpendicular to the original flow vector. The shedding pattern is stable, and alternates such that a steady oscillation, in the sonic range, occurs within the liquid.
(3) The stresses set up within the fluid by sonic oscillations cause the fluid to cavitate in the ultrasonic frequency range.
It is the high level of cavitation combined with shear and turbulence within the Sonolator's mixing chamber which shatters product particles and emulsifies liquids.
The level of cavitation is monitored by acoustic intensity instrumentation provided with each Sonolator Homogenizer. Use of the instrumentation assures control and reproducibility of particle size over long, continuous runs or from one batch to the next."

Now, the orifice is not actually elliptical, but cut by a 60° wedge to form an eye type orifice with sharp edges including the edge corners. The nature of this is that it gives a flat, rather thin, jet. Experimental fact shows that the desired high shear varies with shape of the opening being greater, the greater ratio of the periphery of the cross section to its area. The orifices used have length over width ratios, generally up to 8 to 1 or greater than 8 to 1, which provide a high distance to cross section areas of the same order.

These sharp-edged slot orifices are concave on the upstream side and produce a somewhat fan-shaped thin jet and dissipate its kinetic energy into turbulence in a shorter distance of travel than if the upstream face of the orifice plate was flat. Further, the jet is sputtery and quickly sheds the formed vortices producing the so-called jet edge tone. Thus, from a mixing phenomena, in minimal time, this primary action of a Sonolator fits required criteria.

The jet's reaction with the blade splits the jet into two sheets in high shear—so-called boundary layers—one on each side of the blade. Further, the shear layers consisting of eddies (or vortices) amalgamate to give birth to a larger structure, as recently photographed by reported research and photographed by sonic circa 1966 at lower jet velocities. The impact of this is that, by adjusting the blade to orifice distance, one can find optimum point of reaction with the blade or vibratile element absorbing energy from the fluid in one frequency and returning it in another range. Acoustic pressure is indicated by a small transducer inserted into the conduit and between the orifice and tip of blade locations. The blades vibrate in the ultrasonic region and at such frequency as to produce cavitation, which is a mode that has the tremendous intensity of even pitting the blades over period of time. This orifice/blade interplay gives an environment of extremely short time, but extremely intense mixing and particle transport and diffusional rates.

Also of great importance is ease and confidence of scale-up for commercial production rates, and this has been demonstrated for the Sonolator for a number of applications.

It has been found that high sonic and ultrasonic energy is effective in causing high intensity mixing and instantaneous reaction of the protein and acid. It has also been found that the ultrasonic device made by Sonic Corporation, of Stratford, Conn., and sold under the Trademark "SONOLATOR" is especially effective for use with the, present process. This mixing and reaction environment of the materials within the ultrasonic device is instantaneous and of the order of one second or less. It is this instantaneous reaction time which permits this process to be successfully used in producing the products contemplated by this process.

It is believed, after experimentation, that the formation of the finely divided coagulum produced might bear some analogy to sonation effect on crystallization, although far more complex. Research at the University of Connecticut demonstrated that the Sonolator improved crystallization and produced a very uniform small crystal. These were found important for use in drugs for subcutaneous injections. The dosage of drug was reduced significantly because of the increased surface area of the smaller, more uniform crystals. Theorized was that cavitational bubbles at the edge of the vibrating blade acted as sites in a super saturated solution for crystallization. Since these bubbles were of great magnitude in number, they created myriads of small crystals which, in turn, served as nuclei. These techniques have been employed in penicillin crystallization and in the recrystallization of sugar. Thus, where direct acid additions are made to a proteinaceous feed stock to bring it to an isoelectric point at requisite temperature, one analogously has a super saturated phenomena similar to sugar solution conditioning, albeit a complex mixture and multi-component organic/inorganic/biochemical composition.

The initial conception, before experimentation, that produced an instant solidified curd was that of obtaining the ultimate in uniformity of reaction mass. The results were astounding, since other types of mixing, as reported, required much longer times and were usually of a batch, rather than a continuous nature, and, as experimentally demonstrated, conventional types of mixing do not give the same quality of product, nor in the same time frame.

During acidification of the protein by a suitable acid or coagulation by a suitable coagulating agent, the pH of the protein material is generally lowered past the isoelectric point of the protein which causes coagulation thereof.

The "isoelectric point" is the concentration of hydrogen ions and other ions or electrolytes at which the particle has no net charge and the zeta potential is zero. Under those conditions, the colloid has minimum stability, viscosity, electrical conductivity, and solubility. When colloidal particles also involve chemical reactions with change in pH, for example, proteins associated with calcium, one also has subsequent disassociation.

In cheese making, the age-old techniques of innoculating milk with organisms (indigenous mixed cultures) presents use of controlled cultivated cultures that convert materials to acid achieved through a slow biological process reaching the isoelectric point of most of the contained protein.

The presence of both lyophylic and lyophobic colloids can result in a lyophylic coating around the lyophobic which has a stabilizing effect. Sonolation properly applied could destabilize such a state as occurs in biological systems, milk being a biological product.

Enzymes have characteristic mechanical fragility which is a function of the product of shear rate and time. Activity cqmmences to decrease as this product increases. However, in ultrasonic processing, the extremely short time in the ultrasonic field was found to negate the high shear rates obtained. The ultrasonic processing, in fact, increased activity presumably by making more substrate intimately in contact and possibly through the cavitating phenomena produced over the cell membrane an "ultrasonic filtration" effect similar to ultrafiltration effects, but at higher pressure gradients and near instant of time. This was an unexpected finding that the above theory could explain.

Ultrasonic filtration is similar to ultrafiltration in that high pressure gradients are set up across a cellular fibrous or globular boundary. It is believed that cavitational forces, in terms of pressure differences, are at least an order higher than the pressure gradients across the cellular boundary in ultrafiltration. On the negative cavitational pressure side, the cell membranes thus formed will expand to greater surface or the cell membranes, fractionate, and, on the positive pressure side, have internal substances forced out under pressure gradient and collapsing cell membranes. The normal coiled proteinaceous molecules can, under high ultrasonic and cavitational energy forces, unwind, making these molecules more reactive. Theoretically, one should, under cavitational influence, be able to use less rennet, as was indicated by experimental results.

Cheese products are either acid set, rennet set, or combinations. Acid set may be from biological starter fed to convert lactose to lactic acid (but the metabolic pathway produces other compounds), or by direct acid addition. The control advantages using direct acid become apparent. Rennet, which causes the protein source, such as milk, to coagulate into a custard-like mass, normally requires a reasonable time to complete. For example, homogenized milk coagulates in about 30 minutes, and milk made from ultrafiltered instant nonfat dry milk powder may take up to 90 minutes. In contrast, using the reaction system shown in FIG. 2 for either case, one would get an immediate coagulation.

Theorized is that, whereas rennet in conventional much longer reaction time must be kept at lower temperatures, its effectivenes, where fed at those lower temperatures into a much higher temperature reactive environment for very short time of reaction, does not immediately nullify the rennet and does provide for reaction rates that, according to theory, generally double for each 10° increase in temperature. The reaction zone, instead of being relatively quiescent, is one of violent dispersion, inter-reaction, and, as theorized, influenced by a phenomenon of ultrasonic filtration that gets past the slow transport mechanisms into and out of cell structures, as well as the affects of cavitational phenomena on precipitation.

Of note is that concentrated acids were diluted 1 to 4 in water and, thus, very strong concentrations were used in the experiments. Even with sulfuric acid, there was no protein burning or localized coagulation down to a pH of 2.6.

Referring now to FIG. 1, the schematic diagram of the apparatus in its simplest mode for carrying out the present process is thereshown. In FIG. 1, a tank 10 contains the protein material which is pumped through a conduit 12 by means of a motor and control pump unit 14. The protein material is in liquid form and is pumped into a pre-introduction chamber 16 of an in-line sonic device 18. A second tank 20 contains a liquid acidic material which is used to coagulate a protein material. The liquid acidic material or protein precipitating agent is pumped through the conduit 22 by a motor and control pump unit 24 into the pre-introduction chamber 16 through a tube extending up to the high inlet velocity zone of the orifice. A pressure gauge 16a constantly monitors the pressure in the preintroduction chamber. The sonic device is provided with an orifice 26 through which the streams of protein and acidic materials are directed. The orifice is of eye-shaped configuration and produces admixing of the protein and acidic materials as the materials are directed into the sonic chamber 28.

A resonating blade 30 is positioned in obstructing relation with respect to the jet of admixed materials so that the latter is contacted by the admixed stream. The kinetic energy of the high velocity liquid jet stream is converted into high sonic and ultrasonic energy by utilizing a physical phenomenon known as a jet-edged tone. The jet of liquid under pressure is forced through the eye-shaped orifice 26 at a high velocity (150 feet/second to 200 feet/second) and is directed at the leading edge of the resonating medium or blade 30. It is pointed out that, in the zone located between the orifice and leading edge of the blade, the jet stream of liquid sheds vortices perpendicular to the original flow vector. The shedding pattern is stable and alternates such that a steady oscillation in the high sonic and ultrasonic range occurs within the liquid. The stresses set up within the fluid by the high sonic and ultrasonic oscillations causes the blade to oscillate and the fluid to cavitate in the ultrasonic frequency range.

It is pointed out that stream flows are precisely controlled by, in the case of positive displacement pumps, motor speed controls, such as Parametrics Parajust, which have wide frequency ranges controllable by ±0.1%. Thus, the feed rates can be accurately set and adjusted as need be, based on existing product modifications desired. The respective motor controls for pumps RPM (revolutions per minute) and equivalent GPM (gallons per minute) and related pumps are the components 14 and 24 of FIG. 1. Normally turn down ratios of total flow via streams through conduits 12 and 22 of 10 to 1 can be accommodated either for test trials or desired production rates out of the Sonolator.

As previously discussed, there are several control parameters used in this controlled process system. The concentrations, temperatures, pH or other feed stream parameters are at the control of the operator. The sonic device 18, per se, has the following control parameters, upstream pressure as shown by gauge 16a or equivalent, downstream pressure by 34, and acoustic pressure via an electrical transducer inserted in the downstream wall of the chamber of sonic device 20 such that it converts acoustical energy intensity to electrical output, indicated by acoustic pressure meter 28a. The meter is designed to detect and integrate sound levels to 100,000 Hertz (generally anything above 20,000 is considered inaudible and ultrasonic). The sonic device 18 has provision for insertion of different sized orifices and corresponding blade specifications. However, the normal turn down ratios are of the magnitude of 10 to 1, which provide for considerable accommodation. Further, in peaking the acoustic energy (for the most versatile arrangement), an adjustment element 38 provides for adjusting the vibratile element or blade 12 proximity to the orifice so as to optimize results at a point perpendicular to the jet at which the blade frequency is peaked, as well as the total cavitational acoustic energy previously described. It turns out there is, as also previously explained, an effect of back pressure on cavitation, and this back pressure is mostly produced by back pressure valve 36 and read by gauge 34.

To initiate, in this case of proteinaceous product, a mixing/dispersion/reaction phenomena, one generally first feeds the major feed item 10 and sets the acoustical meter to its most sensitive scale, after first testing the meter 28a by a built-in response mechanism. By then increasing back pressure via the valve 36, and blade to orifice distance by means of adjustment element 38, one can select the correct range of sensitivity for acoustic meter 28a, and adjust for maximum reading for selected flow rate, as set and controlled by pump 14. The small amount of stream exiting by discharge conduit 32 can be recycled to source 10 in an unreacted state or separately fed later. Its physical condition will show a high degree of dispersion and not deleterious to its later reaction when source 10, for example, an acid solution, is introduced, or when other additives are likewise co-dispersed and/or reacted within the sonic device. The specific ratios for the feed streams are a matter of simply setting the motor speed control components of the motor pump units 14 and 24. Once the conditions for the major stream have been set as to flow and sonic device 18 tuning (as just described), all stream flows may be initiated. Generally, no other adjustments need be made, but in some cases, wherein the physical properties of the dispersed and reacted media greatly change as to viscosity and/or density, one can further optimize results by adjusting the blade to orifice distance and the back pressure.

Further, it is found, as may be suspected, that a higher upstream pressure and, thus, overall pressure drop—upstream of orifice to just downstream of blade—can give more acoustic energy intensity if that is required, which only experience can show is beneficial or not. To effect cavitation, it has been found that upstream less downstream pressure should be 250 psi or greater. Higher viscosity fluids usually require high pressures and velocities. Also, too high a back pressure can modify the cavitational mode of the sonic device. Not described are the methods of keeping the feed stocks at desired temperature or pre-mix conditions, as those can be of conventional design. Generally, any heat loss through the sonic device walls to ambient air is negligible, as the time element in the system is so short. Also, some of the energy of pumping converts to heat which offsets, to some degree, any heat losses. Experimentally, temperatures could be kept within 1 or 2 degrees, and large production systems for other sonic device uses bear this out. Heat of reaction in making a curd from milk, as an example, does not significantly effect total mass flow temperature. Further, the different sources may be fed at different temperatures, either because of preconditioning stipulations, or for temperature-sensitive products, such as rennets. Interestingly, rennet, once within a sonic device 18, was found to perform well in this extremely short reaction environment at higher mixed temperature.

The conversion system is amenable to batch or continuous modes, but the continuous mode offers advantages regarding equipment investments and operating labor.

The proteinaceous material may include whole milk, soy flour, soy milk, whey protein concentrate, fish protein, ultra-filtered renntes, cheese additions made through this and other processes, egg albumen, blood, animal derived products, cereal proteins, microbial proteins, and cheese base produced by ultra-filtration. These ingredients, with the exception of microbial protein, also contain fats, salts, lipids, oils, and other natural constituents, all of which can be supplemented as required. The acidic group will depend in part on the type of product desired and synthesized chemically or biochemically, e.g., lactic acid. The acidic group includes, but is not limited to, lactic acid, carboxylic acid (such as carbonic acids), sulfuric acid, phosphoric acid, and hydrochloric acid. When whole milk or a milk derivative is used as the proteinaceous material, a semi-solid cheese product is produced by the process. In this regard, the sonic device 18 is an in-line processing device so that the coagulant is continuously produced during the process.

Figure 2:
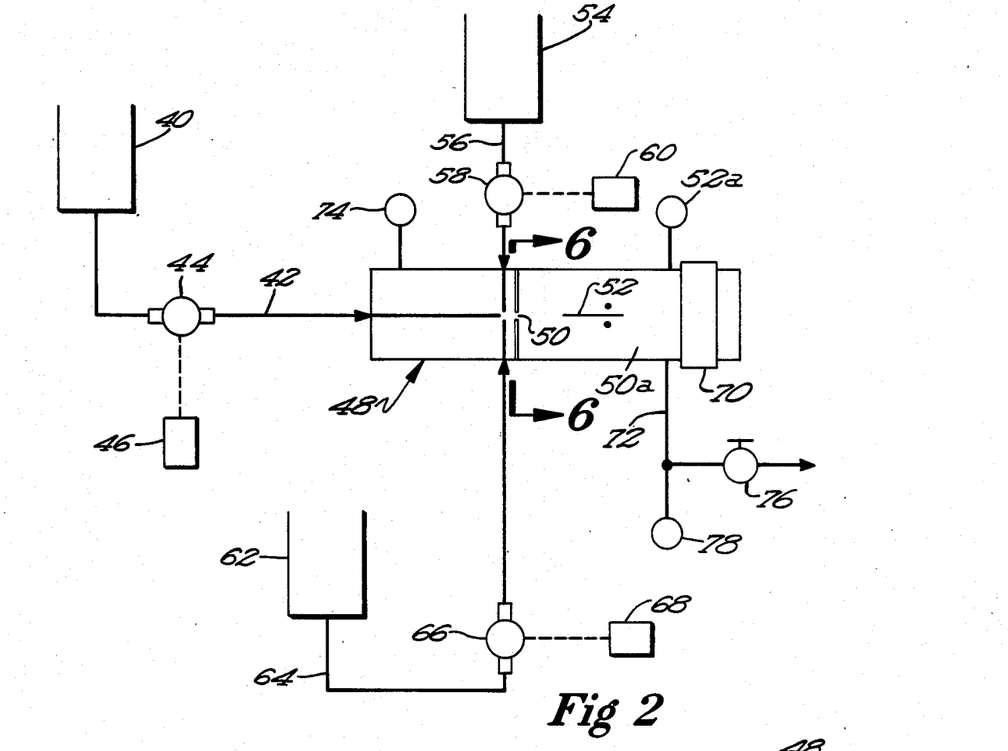
FIG. 2 is a diagrammatic view of a more generalized form of the apparatus processing a multiplicity of feed streams used in carrying out the novel method.

Referring now to FIG. 2, a modified form of the embodiment is thereshown, and the sonic device is illustrated in slightly more detail. The apparatus illustrated for carrying out the process includes a tank 40 which contains the proteinaceous material. The proteinaceous material is in a liquid form and is pumped through a conduit 42 by a pump 44. Liquids may contain suspended particles or globules, as in milk, and may be multiphasic. A liquid is any pumpable fluid. The pump 44 is operated by a suitable motor and control unit 46 so that the liquid stream is directed into the preintroduction chamber 48 of the sonic device. The liquid acidic material is contained within a tank 54 and is pumped therefrom through a conduit 56 by a pump 58. The pump 58 is operated by a suitable, motor and control unit 60 by a conventional coupling so that the acidic material is directed into the preintroduction chamber 48 into the high inlet velocity zone, as earlier described.

Figure 3:
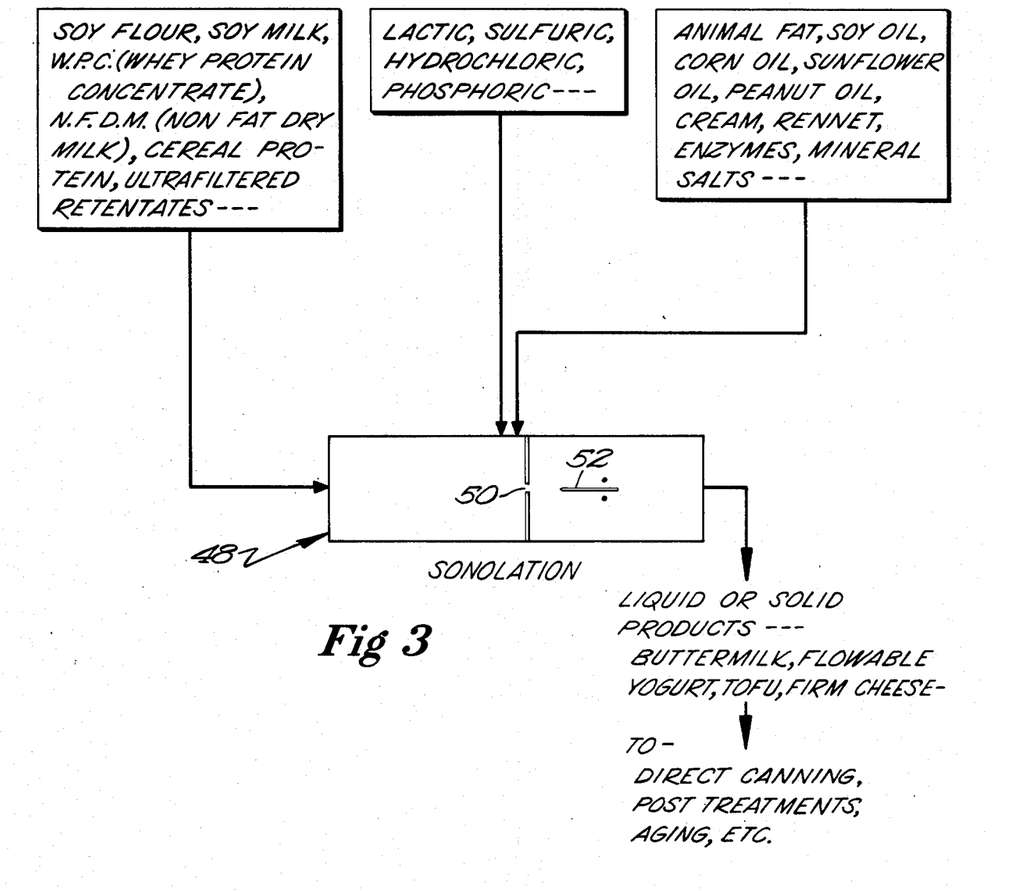
FIG. 3 is a diagrammatic flow chart illustrating the various materials that can be used in carrying out the novel method in number of combinations.

In a cheese making operation, additives and the like may be used. These may include animal fat, tallow, soy oil, corn oil, sunflower oil, peanut oil, cream, rennet, enzymes, mineral salts, and the like. In the embodiment of FIG. 2, selective additives are contained within a tank 62 and are pumped therefrom through a conduit 64 by a pump 66 coupled to an electric motor and control unit 68. The additives are also pumped in an analagous manner as the acid streams into the pre-introduction chamber where the three streams are directed through the orifice 50 and into the sonic resonating chamber 50a. The stream of admixed materials will be directed against the leading edge of the blade or resonating medium 52. In the embodiment of FIG. 2, the element 70 permits the blade 52 to be shifted towards and away from the orifice 50. The coagulant is discharged through a conduit 72 which is provided with a pressure gauge 78 and a valve 76 to control the back pressure. It will be appreciated that, by controlling the back pressure, and the position of the leading edge of the blade with respect to the orifice, the conditions in the sonic chamber 58 may be adjusted. FIG. 3 illustrates a flow diagram of the process including various groups of materials which may be used in a cheese product in any desired selection and ratio, e.g., acid and rennet can be fed as one stream, and protein source as another.

Figure 6A:
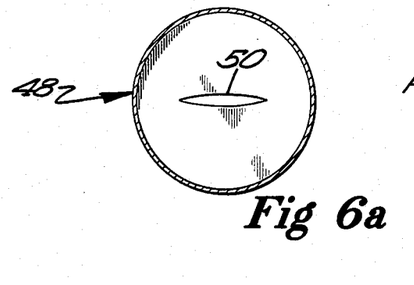
FIG. 6a is a diagrammatic view of the orifice opening advantageously used by the apparatus employed in carrying out the novel method.
Figure 6B:
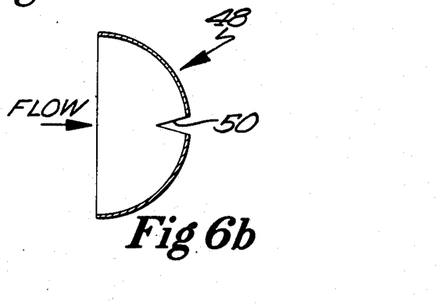

Referring now to FIG. 6, it will be seen that the orifice 50 is of eye-shaped configuration and has a transverse or width dimension approximately eight times the height dimension. Thus, the three streams of materials are directed through the jet to produce a flat rather thin jet. It is also pointed out that the orifice is concave on the upstream side and produces a fan-shaped fan jet which tends to dissipate its kinetic energy in turbulence in a shorter distance of travel than if the upstream face of the orifice plate was flat. The jet of admixed materials is sputtery and quickly sheds the formed vortices producing the so-called jet edge tone. The sonic blade 52 splits the jet into two sheets in high shear (the so-called boundary layers), one on each side of the blade. These shear layers consist of eddies and vortices and this energy is immediately transferred to the blade to cause the latter to vibrate in the high sonic and ultrasonic frequencies. It is pointed out that, by adjusting the blade 52 to orifice 50 a distance, one can find the optimum point of reaction with the blade and the absorption of energy from the fluid in one frequency and returning it in another range.

Referring again to FIG. 2, the stream velocity through the orifice 50 is of the order of 100 feet/second and more generally in the range of 150 feet/second to 200 feet/second. The desired velocities can be selectively adjusted by the motor controls for the various pumps.

The transfer of the kinetic energy from the jet stream of liquid material to the resonating blade produces the high sonic and ultrasonic energy which produces the cavitational effects. The cavitational effects produce the intense mixing and instantaneous reaction involved in the present process. Cavitation results whenever the acoustic pressure in a radiated wave exceeds the hydrostatic pressure in the water (or other liquid). When this happens, the water or other liquid is incapable of maintaining contact with the propagating surface such as the blade in a sonulator during its return motion, and this results in a cavity being formed. The particles comprising the membrane formed by cavitation absorb the radiated high sonic and ultrasonic energy and the energy is transferred to the particles causing diffusion and instantaneous reaction.

Cavitation occurs in liquids at atmospheric pressure when the intensity of the vibrating blade is 0.326 watts/cm$^2$. Thus, 0.326 watts/cm$^2$ may be taken as a threshold or minimum requirement of the energy level for the blade in the present process.

Referring now to FIG. 2, it will be appreciated that back pressure in the sonic chamber 50a may be increased by adjusting the valve 76. Therefore, if the back pressure is increased to two atmospheres, one would analogously calculate a minimum of 1.30 watts/cm$^2$, which would be a minimum for these particular conditions. It is pointed out that the sonic device illustrated in the drawings is capable of producing higher intensities.

It is also pointed out that cavitation, including the advent of bubble formation and collapse, is affected by back pressure. Back pressures of sufficient magnitude can theoretically suppress bubble formations and cavitation. On the other hand, back pressures which are too low result in the bubbles being swept out of a concentrated collapsing zone. It will, therefore, be appreciated that the sonic devices may be adjusted to give results, depending on pressures, flow, blade to orifice distance, and back pressure for given feed compositions and conditions.

It is pointed out that there are several controls used in the present process. The concentrations, temperatures, pH or other feed stream parameters are at the control of the operator. With respect to the sonic device, the upstream pressures in the pre-introduction chamber 48 will be indicated by the indicator gauge 74. The downstream pressure in the sonic device will be indicated by the pressure gauge 78 which is connected in the outlet conduit 72. The sonic device is also provided with an acoustic pressure meter 52a which is connected to an electrical transducer inserted into the sonic chamber 50a. The transducer (not shown) converts acoustical energy intensity to electrical output which is read by the acoustic pressure meter 52a. The meter is designed to detect and integrate sound levels up to 100,000 Hertz (generally anything above 20,000 Hertz is considered inaudible and ultrasonic).

It is pointed out that the sonic device has provision for insertion of different sized orifices and corresponding blade specifications.

At the beginning of the operation, the position of the blade 52 relative to the orifice 50 will be adjusted by the adjustment element 70 until the optimum conditions are determined. The valve 76 will be adjusted so that the optimum back pressure will be determined by the gauge 78. During this adjustment procedure, a small amount of material which is directed through the outlet conduit 72 may be recycled and separately fed later. The motor speed controls 46, 60, and 68 will be adjusted to obtain the desired ratios for the feed streams. When these determinations are made, generally no other adjustments need to be made.

However, it is pointed out that a higher upstream pressure and the attendant pressure drop in the sonic chamber can produce more acoustic energy intensity. In this regard, to produce cavitation, it has been found in pilot runs that the upstream less downstream pressure should be 250 psi or greater. The flow through the orifice is designed to be 150 feet/second greater, and it is preferred that the orifice have an 8 to 1 length, versus width ratio. The feed stocks should be maintained at a predetermined desired temperature. These temperatures should be maintained to within 1 to 2 degrees of the desired levels. Typically, pilot runs included conditions of operating temperatures forming a semi-solid food product range from about 105° to 185° F., depending on the original ingredients and the end product to be formed. Temperature is only limited by pumpability of the fluids and obtaining in situ an adequate reaction rate. Typical flow rates ranged from 2.4 to 6.8 gallons per minute at operating pressures of 400 to 800 lbs. per square inch during pilot runs. Concentrated acids diluted 1:3 or 1:4 included 85% phosphoric, 88% lactic, 98% sulfuric, and acetic acid. The pH values ranged from 2.6 to 5.2 during these pilot runs. It is also pointed out that, while the present process may be operated as a batch feed system, it it is preferred that the continuous mode be used because of the advantages regarding equipment investment and operating labor.

The present process can be used to make a variety of foodtype products. For example, the present process can be used to make liquid products, such as buttermilk or similar type products, from whole milk. Further, the process can also be used to make soft cheeses, such as yogurt, cream cheese, or may be used to make hard cheeses. In this regard, the use of high sonic and ultrasonic acoustic energy, along with the cavitational phenomenon, gives the required instant reaction and homogenization that produces stable products. The reaction time within the sonic chamber is 0.6 seconds and never more than approximately 1 second. The residence time of the materials in the sonic device from entry to exit is approximately 4 seconds. This is in sharp contrast to the prior art systems which require minutes, if not hours, to produce similar type products. FIG. 3 of the drawings is illustrative of the various kinds of ingredients which may be used in making these various products. It will be noted that one group of the materials to be used in the formation of the semi-solid products can be characterized as highly proteinaceous, including the soy flour, soy milk, whey protein concentrate, etc. Another group of materials may be characterized as acidic or immediately reactive and include the various acids, such as lactic acid, sulfuric acid, hydrochloric acid, and phosphoric acid. The third group of materials sometimes function as time delay materials, such as enzymes and bacteria, but also include flavorings, emulsifiers, and the like.

Figure 4:
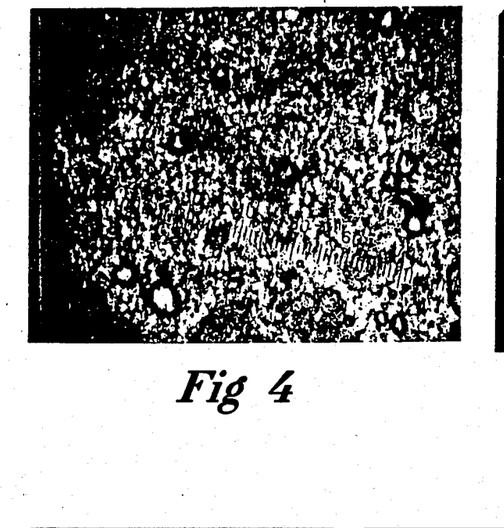
FIG. 4 is a photomicrograph of a coagulum produced by the prior art process magnified one hundred times.

FIG. 4 is a photomicrograph of an acid precipitated coagulum made from a concentrated skim milk by adding acid to the concentrated skim milk in the quiescent state in the manner of the prior art.

Figure 5:
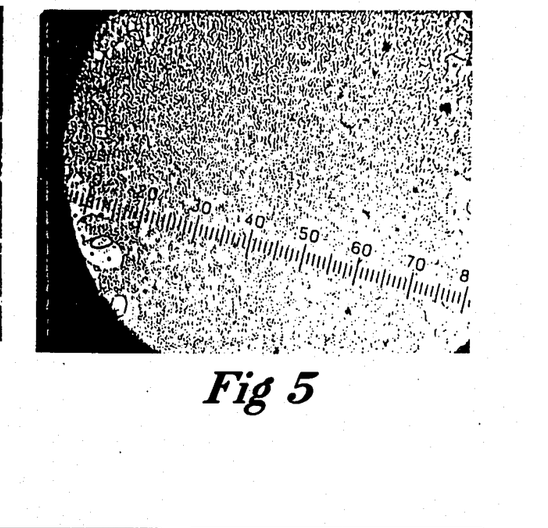
FIG. 5 is a photomicrograph of a coagulum produced by the present process magnified one hundred times.

FIG. 5 is a photomicrograph of an acid precipitated product made from concentrated skim milk by direct acidification using the present process. Although the photomicrographs are enlarged 100 times and each division of the scale that is superimposed on the photomicrograph is approximately 4.8 microns, the pH of the coagulum in FIG. 4 is approximately 5.2 and the pH of the coagulum in FIG. 5 is approximately 5.1. The coagulum in FIG. 4 has a highly non-uniform particle size distribution, while the coagulum produced by the subject process has a highly uniform particle distribution, as shown in FIG. 5. The particle size of the coagulum produced by the present process is mostly in the low micron or sub-micron range, with only a few being of the order of 2 to 4 microns. The present process produces a predictably smooth product having substantially uniform particle size.

The following are examples of the present process:

EXAMPLE 1

In a pilot plant experiment, a Sonolator was used to make a cream cheese-like product. 16.89 lbs. of dried ultrafiltered skim milk was reconstituted with 31.27 lbs. of water and 51.84 lbs. of 40% fat cream to produce a low lactose high protein and fat solution having the exact composition of the finished product and used as one stream. Separately, concentrated phosphoric acid (88%) was diluted with three parts of water at ambient temperature to use as the second stream. The protein and fat stream was heated to 106° F. and then both the protein and fat stream and the acid stream were separately fed into a DF Triplex 2000A Sonolator having an orifice of 0.006 and an operating pressure of 400 psi. The respective feed rates were 1.56 gpm (gallons per minute) for protein/fat feed and 0.06 gpm for the acid. This addition of 38.5 ml. acid solution per liter of protein/fat solution reduced the milk pH from 6.6 to 5.2 producing a cuttable soft, homogeneous cream cheese-like product with negligible syneresis or water separation at prescribed pH. This product was formed in situ and extended from the reactor. Adjusting the feed rates further allowed the instantaneous production of acceptable products with pH levels of 4.6, 4.0 and 3.6.

EXAMPLE 2

In a pilot plant experiment, cheese has produced from a premix of UF skim milk powder and water fed as one stream and acid Vitex solution as the second stream to produce a low fat (less than 0.5%) cheese product containing 30% solids. A premix of 35% UF milk powder and water was made by simple dispersing means. The initial pH was 6.7 with a viscosity over 50,000 cps (centipoises). An acid Vitex was made with phosphoric acid diluted 1/6 with water. Both milk slurry and acid Vitex solution were heated to 106° F. and separately fed into the same Sonolator used in Example 1 at a pressure of 400 psi and at rates of 2.3 gpm and 0.121 gpm, respectively. The product had a pH of 5.0. Viscosity of product was not measurable, but the subjective consistency was that of a soft cheese. Upon cutting the coagulum, similar to the practice in making cottage cheese, the product was similar to a cottage cheese curd.

EXAMPLE 3

A milk-soy protein cheese product was produced by mixing 40 parts of ultrafiltered whole milk retentate having a 40% solids content with 60 parts of soy milk. The mixture was then heated to 150° F. A coagulating mixture was prepared separately by combining three parts of distilled water with one part of concentrated lactic acid (88%). Rennet at 0.25% by weight, 2% salt by weight, and 0.3% calcium chloride was added to the coagulating mixture. The milk-soy protein mixture was fed as one stream and the coagulating mixture was fed as another stream into a model A Sonolator having a 0.004 orifice and at an operating pressure of 800 psi. The coagulating mixture was added at a rate capable of reducing the pH of the milk-soy protein mixture to 5.2, 4.6 and 3.3. A soft, smooth coagulum was produced at the 5.2 pH, similar to cream cheese. A firm, though grainier, coagulum was produced at the 3.3 pH. The 4.6 pH produced a product having a suitable cream cheese texture. The operating pressure was also reduced to 400 psi at pH levels of 5.2, 4.6 and 3.3. At all the pH levels, with the reduced operating pressure of 400 psi, similar products were produced that were characterized with reduced wheying off.

What is claimed is:

1. A continuous steady flow process ehibiting short reaction time for converting basic proteinaceous raw materials in situ into a homogenous protein matrix comprising fasts, water and protein entrapped as a stable dispersion in the protein matrix, consisting essentially of:

combining an accurately metered and proportioned liquid stream or streams of basic proteinaceous raw materials with an accurately metered and proportioned stream of reactive material selected from the group consisting of acidulants and enzymes in an introductIon mixing chamber at a location adjacent and central to an orifice, and, within a fraction of a second of entry into the introduction chamber, instantaneously and continuously moving the combined liquids through the orifice to instantaneously admix and react the basic raw materials and reactant material and to form a single continuous jet stream having kinetic energy equivalent to a velocity of at least 150 feet per second and kinetic turbulent energy at ultrasonic frequencies, continuously directing the single jet stream into contact with a resonating medium in a resonant chamber so that the kinetic energy of the jet stream causes resonation of the resonating means at ultrasonic frequencies, thereby amplifying the intensity of the mixed stream energy through the production fo cavitation by the resonating medium to cause ultimate mixing, dispersion, and homogenization and reaction of the basic raw material and reactive material to instantaneously form a protein matrix, and continuously removing the protein matrix from the resonating chamber.

2. The process as defined in claim 1 wherein said basic materials comprise food grade milk fractions, concentrates or combinations thereof, and said reactant material comprise a protein precipitant which contains food grade acidulants, and wherein the ultrasonic and cavitational energy results in thorough acidification of the food grade milk or fractions thereof within a total time interval of not more than four seconds and wherein the protein matrix form comprises solid or semi-solid products.

3. The process as defined in claim 1 wherein said resonating medium comprises a resonating structure which resonates in response to the transfer of the kinetic turbulent energy from the stream to produce a sound pressure intensity of not less than 1.3 watt/cm$^2$.

4. The process as defined in claim 2 combining and reacting with said stream of food grade milk and said stream further comprising of food grade acidulants additional streams of materials selected from the group consisting of rennet, pepsin, mineral salts, and animal and vegatable oils.

5. The process as defined in claim 1 wherein the stream of basic material and reactive material is introduced at a jet velocity of at least 150 feet/second into the resonating chamber through an orifice of eye-shaped configuration having a length to width ratio of approximately 8 to 1, said orificee being defined by upper and lower edges of the same symmetrical length and curve and having identical geometrical relationships.

6. The process as defined in claim 5 wherein the resonating chamber has an interior which is maintained at a pressure not less than atmospheric, and the pressure upstream of the eye-shaped orifice is not less than 250 pounds per square inch.

7. The process as defined in claim 2 wherein said acidulants comprise organic and inorganic acids which are fed as one stream and at a ratio sufficient to bring the proteinaceous compoennts of said basic materials to the lowest pH required to meet desired isoelectric points and to a pH within the range of about 2.6 to about 5.2.

8. The process of claim 2 wherein acids selected from the group consisting of lactic acid, carboxybic acid, sulfuric acid, phosphoric acid and hydrochlorie acid, are added in concentrations at least as high as 20% as an acid stream without localized precipitation of protein and whereby said solid or semi-solid product has a pH of about 4.6.

9. The process of claim 2 wherein the homogenization of the product in situ minimizes the loss of milk whey and milk solids and optimum yield is obtained.

10. The process of claim 1 wherein the basic materials are selected from the group consisting of dried protein ultrafiltered milk, dry milk and soy flours and said basic materials are admixed with water to give a concentration feed which is reacted thereafter with acids, salts or enzymes to give smooth products with a particle size distribution substantially in the micron or sub-micron range.

11. The process of claim 1 wherein the stream of basic proteinaceous material is heated to a temperature no greater than 185° F. and reacted with acid.

12. The process of claim 1 wherein all feed streams are deaerated or degassed to minimize air-water type emulsions and to promote finer protein matrices.

13. The process of claim 1 wherein the admixed streams of basic proteinaceous raw materials and reactant stream have an upper temperature of at least 185° F. and a lower temperature near freezing at a point of nonpumpability or about 300,000 centerpoises.

14. The process as defined in claim 1 wherein said protein matrix is extruded from the resonant chamber.

15. The process as defined in claim 14 wherein said extruded protein matrix is shaped or cut into a desirable configuration.

16. The process as defined in claim 1 wherein pressure drop across the orifice is sufficient to produce jet velocities that causes the resonating medium to cavitate from action of the impinging jet stream, and upstream pressure is below 2,000 pounds per square inch.

17. The process as defined in claim 1 wherein the residence time of the liquid steams from the point of entry into the mixing chamber to the point of removal of the protein matrix from the resonating chamber is approximately four seconds.

18. The process as defined in claim 1 wherein the magnitude of the cavitational energy produced by the resonating medium is accurately controlled through adjustment of an intensity control means.

19. The process as defined in claim 7 wherein said solid or semi-solid product has a pH of about 4.6.

20. A continuous steady flow process exhibiting short reaction time for converting basic proteinaceous raw materials in situ into a homogeneous protein matrix comprising fats, water and protein entrapped as a stable dispersion in the protein matrix, consisting essentially of:

combining an accurately metered and proportioned liquid stream or streams of basic proteinaceous raw materials with an accurately metered and proportioned stream of reactant material selected from the group consisting of acidulants and enzymes in an introduction chamber at a location adjacent and central to an orifice, and, within a fraction of a second of entry into the introduction chamber, instantaneously and continuously moving the combined liquids through the orifice to instantaneously admix and react the basic raw materials and reactant material and to form a single continuous jet stream having a velocity of at least 150 feet per second and kinetic turbulent energy at ultrasonic frequencies, continuously directing the single jet stream into contact with the leading edge of a substantially flat resonating blade in a resonant chamber so that the high kinetic energy of the jet stream causes resonation of the resonating means at ultrasonic frequencies, thereby amplifying the intensity of the mixed stream energy through the production of cavitation by the resonating medium to cause ultimate mixing, dispersion, and homogenization and reaction of the basic raw materials and reactive material to instantaneously form a protein matrix, the general plate of the resonating blade being disposed in the direction of the flow of the jet stream, and continuously removing the protein matrix from the resonating chamber.

21. The process of claim 20 wherein air or $CO_2$ gases are injected directly after the stream passes the resonating blade by means of a microporous tube inserted sleeve, said gases assisting latent aerobic or anaerobic bio-reactions.

* * * * *

UNITED STATES PATENT AND TRADEMARK OFFICE
CERTIFICATE OF CORRECTION

PATENT NO. : 4,675,194
DATED : June 23, 1987
INVENTOR(S) : Bernard J. Gaffney

It is certified that error appears in the above-identified patent and that said Letters Patent are hereby corrected as shown below:

Column 4, line 45, after "(or precipitant)," insert -- and possibly --.

Column 5, line 50, delete "turning" and insert -- tuning -- therefor.

Column 5, line 56, delete "in" (second occurrence) and insert -- those of -- therefor.

Column 5, line 57, delete "those of" and insert -- in -- therefor.

Column 6, line 38, after "high" insert -- peripheral --.

UNITED STATES PATENT AND TRADEMARK OFFICE
CERTIFICATE OF CORRECTION

PATENT NO. : 4,675,194
DATED : June 23, 1987
INVENTOR(S) : Bernard J. Gaffney

It is certified that error appears in the above-identified patent and that said Letters Patent are hereby corrected as shown below:

Column 6, line 65, after "over" insert -- a --.

Column 7, line 12, delete "environment" and insert -- time -- therefor.

Column 7, line 14, delete "time" and insert -- environment -- therefor.

Column 8, line 8, delete "cqmmences" and insert -- commences -- therefor.

Column 8, line 34, after "results." insert the following Paragraph:

-- The increased reaction kinetics would also be a function of a degree of dispersion of insoluble substrates. Photomicrographs of Figures 4 and 5 show the several fold decrease in particle size using ultrasonic, versus conventional mixing --.

Column 10, line 48, delete "mqde" and insert -- mode -- therefor.

Column 11, line 5, delete "renntes" and insert -- retentates -- therefor.

UNITED STATES PATENT AND TRADEMARK OFFICE
CERTIFICATE OF CORRECTION

PATENT NO. : 4,675,194

DATED : June 23, 1987

INVENTOR(S) : Bernard J. Gaffney

It is certified that error appears in the above-identified patent and that said Letters Patent are hereby corrected as shown below:

Column 12, line 37, delete "sonulator" and insert -- Sonolator -- therefor.

Column 14, line 66, delete "extended" and insert -- extruded -- therefor.

Column 15, line 1, delete "has" and insert -- was -- therefor.

Column 15, Claim 1, line 49, delete "fasts" and insert -- fats -- therefor.

Column 15, Claim 1, line 57, delete "introductIon" and insert -- introduction -- therefor.

Column 16, Claim 1, line 5, delete "fo" and insert -- of -- therefor.

Column 16, Claim 2, line 15, delete "comprise" and insert -- comprises -- therefor.

Column 16, Claim 4, line 27, after "claim 2" insert -- further comprising --.

Column 16, Claim 4, line 29, delete -- further comprising --.

UNITED STATES PATENT AND TRADEMARK OFFICE
CERTIFICATE OF CORRECTION

PATENT NO. : 4,675,194
DATED : June 23, 1987
INVENTOR(S) : Bernard J. Gaffney

It is certified that error appears in the above-identified patent and that said Letters Patent are hereby corrected as shown below:

Column 16, Claim 5, line 38, delete "orificee" and insert -- orifice -- therefor.

Column 17, Claim 13, line 13, delete "centerpoises" and insert -- centipoises -- therefor.

Column 18, Claim 20, line 28 delete "plate" and insert -- plane -- therefor.

Signed and Sealed this

Twenty-second Day of December, 1987

Attest:

DONALD J. QUIGG

*Attesting Officer*       Commissioner of Patents and Trademarks